June 7, 1927.
A. R. PARSONS
TELESCOPING TIRE RIM
Filed Jan. 15, 1926
1,631,429
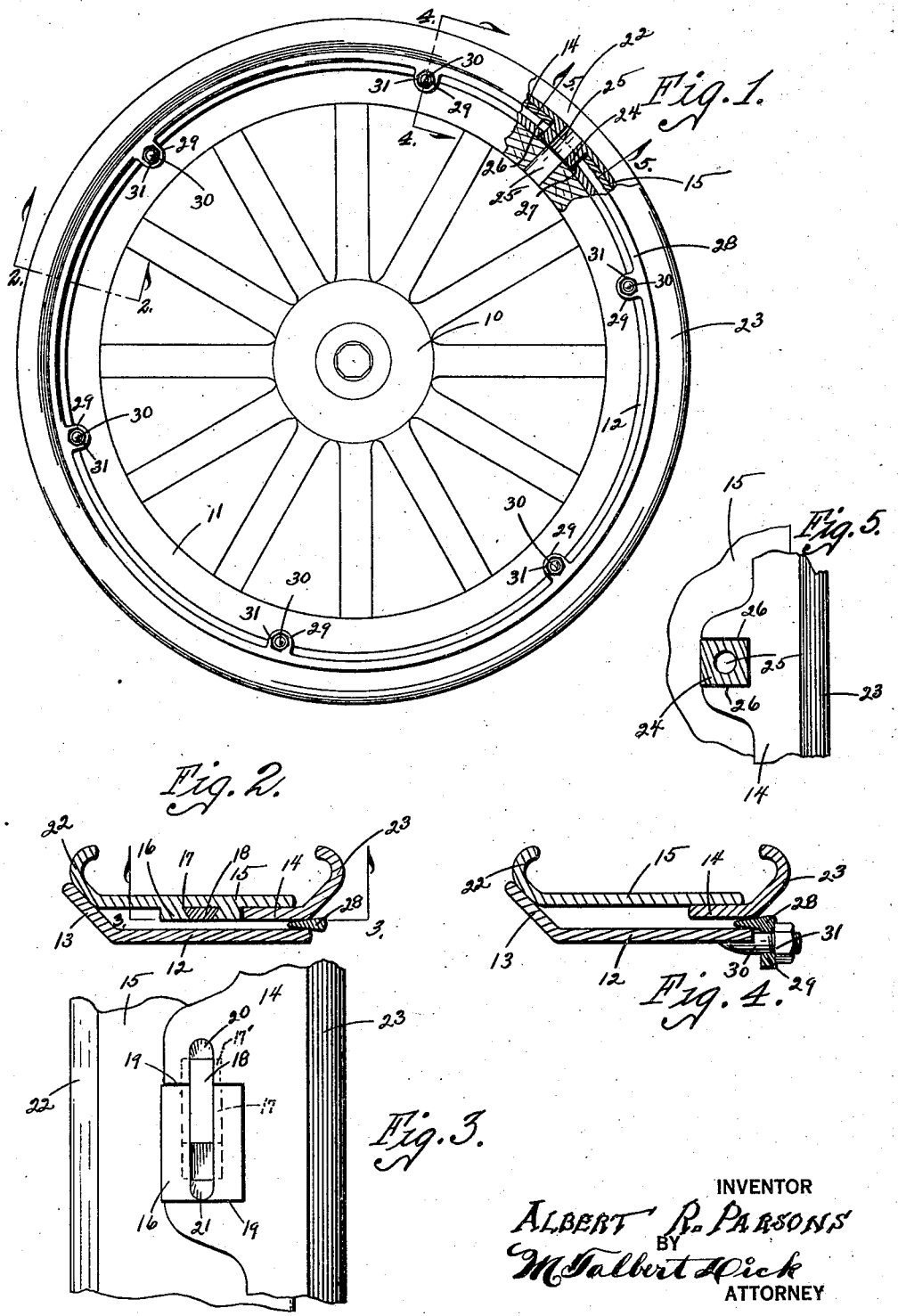
INVENTOR
ALBERT R. PARSONS
BY
M Talbert Wick
ATTORNEY Patented June 7, 1927.

1,631,429

UNITED STATES PATENT OFFICE.

ALBERT ROSS PARSONS, OF BONAPARTE, IOWA, ASSIGNOR OF ONE-HALF TO PAUL WOODS, OF BONAPARTE, IOWA.

TELESCOPING TIRE RIM.

Application filed January 15, 1926. Serial No. 81,391.

This invention relates to telescoping tire carrying rims, and has for its chief object the provision of a rim which is so constructed as to permit the application of a tire thereto, or its removal therefrom without stretching the tire in any way whatsoever, and without the use of tools.

A further object of this invention is to provide a demountable rim, which with the tire may be readily slipped onto the felloe of a wheel and secured thereto without the employment of tools, except a wrench.

A further object of this invention is to provide a tire carrying rim made up of inner and outer sections associated in a manner which permit the sections to be easily separated for the association with or the removal therefrom of the tire, without the use of tools.

More specifically the object is to provide a telescoping tire rim having its two sections held together by one or more dove tail keys.

Still another object is to secure the telescoping rim to the felloe in such a manner that there is no play.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawings, in which:

Fig. 1 is a side view of my complete device mounted on the wheel of an automobile or the like, with a section cut away to more fully illustrate the same.

Fig. 2 is an enlarged cross sectional view of my invention mounted on the wheel rim of the felloe and is taken on line 2—2 of Fig. 1.

Fig. 3 is an enlarged plan view of the means employed to secure the two sections of the tire rim together.

Fig. 4 is an enlarged cross sectional view of my device on the wheel rim of the felloe and shows the means of securing the telescoping tire rim to the wheel rim. It is taken on line 4—4 of Fig. 1.

Fig. 5 shows a sectional view of the means for preventing the two sections of the telescoping tire rim from rotation relative to each other. This also shows the hole through which the stem of the inner tube extends. It is taken on line 5—5 of Fig. 1.

The disadvantages of the demountable tire rims now on the market reside in the fact that a great number of tools are required to place or remove the tire. The placing of the tire on the rim or the removal of the tire from the rim is not only a very difficult task, but tends to stretch the tire and ruin the same. I have overcome these disadvantages by the use of a telescoping tire rim.

I have used the numeral 10 to designate the wheel of an automobile, or the like, having the felloe 11 whose periphery is surrounded by the ordinary permanently fixed metal band 12 called the wheel rim. The edge of this wheel rim adjacent the vehicle to which the wheel is secured, extends outwardly and laterally, as shown in Figs. 2 and 4, the purpose of which will hereinafter be explained. I have designated this outwardly and laterally extending portion by the numeral 13. The rim on which the tire is mounted includes an inner section 14 and an outer section 15; and neither of these sections is split as is the usual tire carrying rim. The outer section is larger in diameter to slip over the inner section. On the inner side of the section 15 is a projection 16 integrally formed thereon. This projection 16 has a dove tail groove 17 opening to one end, in which is slidably mounted the key 18. The numeral 19 designates a notch in the inner section 14 designed to embrace the projection 16. In this inner section, adjacent to and communicating with the dove tail groove 17 is the dove tail groove 17', into which a portion of the key 18 may be slid when the two sections are together. When this is done the two sections will be held together as one unit. The dove tail groove 17—17' thus formed is closed at both ends and the key 18 cannot escape therefrom. To remove the two sections from each other, slide the key 18 out of the dove tail groove 17' and completely into the dove tail groove 17, which is at least as long as said key. This construction is well shown in Fig. 2 and Fig. 3. If it is desired several of the catches may be employed to more securely hold the two sections together. The projection 16 and the notch 19 which normally embraces it, also prevent the two sections from rotation relative to each other. The depressions 20 and 21 in the inner section and projection 16, respectively, communicate with the outer ends of the dove tail grooves 17 and 17', and facilitate the grasping of the key for the sliding of the same in the dove tail grooves 17 and 17'. The outer edges of the inner and outer sections extend upward and outwardly and terminate in annular tire gripping flanges 22 and 23, respectively. The flange 22 not only embraces one side of the tire, but engages the outwardly and laterally extending member 13 when the two sections are mounted on the vehicle wheel. The numeral 24 designates a lug on the inner side of the outer section having the hole 25 through which the stem of the inner tube extends. This lug is embraced by the notch 26 in the inner section as is shown in Fig. 5, and aids the preventing of the two sections from rotation relative to each other. This lug 24 extends into a hole 27 in the metal band 12 on the felloe and thereby prevents the rotation of the sections relative to the wheel 10. The hole 25 communicates with a hole 25' in the felloe 11.

To mount the tire on the tire carrying rim, place the tire on the outer section 15. This is easily done as the outside diameter of the outer section is slightly less than the inner diameter of the tire. Have the key 18, or keys if there are more than one of the catch means employed, slid back in the dove tail groove in its respective projection 16. Place the inner section on the outer section so that the notch 26 will embrace the lug 24 and the notch or notches 19 will embrace the projection or projections 16. Slide the key or keys as the case may be into the dove tail groove 17' adjacent to it, as far as it will go. When this is done the key 18 will be part in the dove tail groove 17 and part in the dove tail groove 17', and the two sections will be securely held together, and the flanges 22 and 23 will be embracing the sides of the tire. By inflating the tire the tendency will be to force the inner and outer sections apart. This action frictionally holds the keys in the position shown in Fig. 3.

The tire and tire carrying rim is now ready to be placed as a spare tire on the back of the vehicle, or mounted on the wheel of the same.

The inside diameter of the tire carrying rim is larger than the outside diameter of the wheel rim on the felloe. This is necessary as the lug 24 extends into a hole in the wheel rim 12, and the stem of the inner tube through both, and play must be provided to compensate for them. After the tire and tire carrying means have been placed on the wheel and the flange 22 is engaging the portion of the wheel rim 13, an annular wedge member 28 is placed between the inner section and the wheel rim. This wedge member 28 has inwardly extending ears 29 with a hole in each. Passing through these holes are bolts 30 secured to the wheel rim. By tightening the nuts 31 on these bolts the wedge member 28 will be forced a certain distance between the inner section and the wheel rim, thereby tightening it on the wheel and engaging the flange 23 and preventing the tire carrying rim from becoming detached from the wheel. To remove the tire and tire carrying rim as an unit from the wheel 10, merely remove the nuts 31.

Some changes may be made in construction and arrangement of my telescoping rim without departing from the real spirit and purpose of my invention and it is my intention to cover by my claim any modified forms of structure or use of mechanical equivalents which may be reasonably included within their scope.

I claim:

A demountable rim comprising an outer section formed with a projection on its inner face, said projection being formed with a dove tail groove opening to one end only of said projection, an inner section formed with a notch at one edge adapted to embrace said projection and formed with a dove tail groove adapted to aline and co-act with the first mentioned groove when said sections are in normal position, a slidable key designed to be completely received in the first mentioned groove and adapted to be moved to a position where it will project partly within the second mentioned groove, and an annular flange on each of said sections designed to embrace one side of a tire.

ALBERT ROSS PARSONS.